United States Patent
Harada (10) Patent No.: US 12,018,675 B2
(45) Date of Patent: Jun. 25, 2024

(54) PUMP HAVING A VALVE MECHANISM STOPPING AND PERMITTING FLOW BETWEEN A SUCTION CHAMBER AND A DISCHARGE CHAMBER

(71) Applicant: ADVICS CO., LTD., Kariya (JP)

(72) Inventor: Tomoo Harada, Kariya (JP)

(73) Assignee: ADVICS CO., LTD., Kariya (JP)

( * ) Notice: Subject to any disclaimer, the term of this patent is extended or adjusted under 35 U.S.C. 154(b) by 487 days.

(21) Appl. No.: 17/291,422

(22) PCT Filed: Dec. 2, 2019

(86) PCT No.: PCT/JP2019/047059
§ 371 (c)(1),
(2) Date: May 5, 2021

(87) PCT Pub. No.: WO2020/111281
PCT Pub. Date: Jun. 4, 2020

(65) Prior Publication Data
US 2022/0003232 A1     Jan. 6, 2022

(30) Foreign Application Priority Data

Nov. 30, 2018   (JP) .................................. 2018-225791

(51) Int. Cl.
*F04B 53/10*      (2006.01)
*F04B 19/22*      (2006.01)
(Continued)

(52) U.S. Cl.
CPC .......... *F04B 53/1095* (2013.01); *F04B 19/22* (2013.01); *F04B 49/24* (2013.01);
(Continued)

(58) Field of Classification Search
CPC .......................... F04B 53/1095; F04B 53/1005
See application file for complete search history.

(56) References Cited

U.S. PATENT DOCUMENTS

| 5,577,896 A | 11/1996 | Harada |
| 7,690,736 B2 * | 4/2010 | Kusano ................. B60T 8/4872 417/259 |

(Continued)

FOREIGN PATENT DOCUMENTS

JP        3278982 B2      4/2002

OTHER PUBLICATIONS

International Search Report (PCT/ISA/210) with translation and Written Opinion (PCT/ISA/237) dated Feb. 18, 2020, by the Japanese Patent Office as the International Searching Authority for International Application No. PCT/JP2019/047059.

*Primary Examiner* — Nathan C Zollinger
*Assistant Examiner* — Timothy P Solak
(74) *Attorney, Agent, or Firm* — BUCHANAN INGERSOLL & ROONEY PC (57) ABSTRACT

A pump includes a fluid outflow mechanism that causes the brake fluid in the discharge chamber to flow out into the suction chamber in accordance with decrease in the volume of the discharge chamber when the feed ring of the valve portion decreases the volume of the discharge chamber in cooperation with the increasing movement of the volume of the first pump chamber in a state where the first pump chamber and the discharge chamber are filled with brake fluid in the suction step.

2 Claims, 4 Drawing Sheets

(51) Int. Cl.
  *F04B 49/24* (2006.01)
  *B60T 13/14* (2006.01)
  *F04B 19/04* (2006.01)
  *F04B 23/06* (2006.01)
  *F04B 53/12* (2006.01)

(52) U.S. Cl.
  CPC ........... *F04B 53/1002* (2013.01); *B60T 13/14* (2013.01); *F04B 19/04* (2013.01); *F04B 23/06* (2013.01); *F04B 53/121* (2013.01)

(56) References Cited

U.S. PATENT DOCUMENTS

| | | | | |
|---|---|---|---|---|
| 7,806,671 | B2* | 10/2010 | Maeda | B60T 8/4031 |
| | | | | 417/471 |
| 7,993,115 | B2* | 8/2011 | Kim | F04B 1/0452 |
| | | | | 417/570 |
| 8,011,906 | B2* | 9/2011 | Harada | B60T 8/4031 |
| | | | | 417/552 |
| 2007/0253846 | A1 | 11/2007 | Bakker et al. | |
| 2011/0239857 | A1* | 10/2011 | Iyatani | F04B 53/125 |
| | | | | 92/163 |
| 2012/0251366 | A1 | 10/2012 | Kuroyanagi et al. | |

* cited by examiner

PUMP HAVING A VALVE MECHANISM STOPPING AND PERMITTING FLOW BETWEEN A SUCTION CHAMBER AND A DISCHARGE CHAMBER

TECHNICAL FIELD

The present disclosure relates to a pump.

BACKGROUND ART

A pump disclosed in the following Patent Literature 1, for example, is conventionally known. This conventional pump includes a first pump mechanism that sucks fluid and discharges fluid according to increase or decrease in the volume of a first pump chamber, and a second pump mechanism that forms a suction chamber and a discharge chamber in a second pump chamber and is relatively movable along an axial direction of the second pump chamber in synchronization with the increase or decrease in the volume of the first pump chamber, and that includes a valve mechanism that shuts off the communication between the suction chamber and the discharge chamber when relatively moved toward the discharge chamber side and communicates the suction chamber and the discharge chamber when relatively moved toward the suction chamber side. Then, in the conventional pump, when the volume of the first pump chamber increases, the valve mechanism relatively moves toward the discharge chamber side to suck the fluid into the suction chamber and fill the fluid from the discharge chamber to the first pump chamber, and when the volume of the first pump chamber decreases, the fluid is discharged from the first pump chamber and the valve mechanism relatively moves toward the suction chamber side to cause the fluid to flow from the suction chamber into the discharge chamber. Here, in the conventional pump, an inner diameter d1 of the first pump chamber, an inner diameter d2 of the second pump chamber, and an outer diameter d3 of the piston are set to satisfy the relationship of the following equation 1 so that all the fluid in the discharge chamber flows into the first pump chamber, that is, the piston returns to a bottom dead center when the volume of the first pump chamber increases.

$$d2 \approx (d1^2 + d3^2)^{1/2} \qquad \text{Equation 1}$$

CITATIONS LIST

Patent Literature

Patent Literature 1: Japanese Patent Publication No. 3278982

SUMMARY DISCLOSURE

Technical Problems

In order to further improve the suction performance and reduce the operating noise of the conventional pump, it is conceivable to increase the speed of the fluid discharged from the discharge chamber to the first pump chamber. In this case, it is conceivable to increase the inner diameter d2 of the second pump chamber in order to increase the amount of fluid discharged at the same movement amount. However, if the inner diameter d2 of the second pump chamber is increased, the amount of fluid sent from the discharge chamber to the first pump chamber increases and the relationship of the above equation 1 collapses, and hence the piston may not return to the bottom dead center. Hereinafter, description will be made on the piston not returning to the bottom dead center.

When the inner diameter d2 of the second pump chamber is increased, a state in which both discharge chambers of the first pump chamber and the second pump chamber are filled with fluid may occur. If a suction step in which the valve mechanism relatively moves toward the suction chamber side and the communication between the suction chamber and the discharge chamber is shut off is performed in such a state, it becomes impossible to discharge the fluid in the discharge chamber to the first pump chamber and hence the pressure in the discharge chamber increases, and the volume of the discharge chamber cannot be decreased, whereby the piston does not return to the bottom dead center. If the piston does not return to the bottom dead center, the volume of the first pump chamber cannot be increased in the suction step as compared with a case where the piston returns to bottom dead center, and thus the discharge amount of fluid discharged from the first pump chamber decreases. Therefore, it is necessary to suppress an increase in pressure in the discharge chamber in the suction step.

The present disclosure has been developed to solve the above problems. That is, an object of the present disclosure is to provide a pump capable of suppressing rise in pressure in the discharge chamber in a suction step in a state where the discharge chambers formed in the first pump chamber and the second pump chamber are filled with fluid.

Solutions to Problems

In order to solve the above problems, a pump according to the present disclosure is provided with a first pump mechanism including a first pump chamber having a variable volume and a first suction opening and a first discharge opening that communicate to the first pump chamber, fluid being sucked from the first suction opening and the fluid being discharged from the first discharge opening according to increase or decrease in the volume of the first pump chamber; and a second pump mechanism including a second pump chamber, a second suction opening that communicates to the second pump chamber, a second discharge opening that communicates to the second pump chamber and also communicates to the first suction opening, and a valve mechanism that is arranged inside the second pump chamber to form a suction chamber on the second suction opening side and form a discharge chamber on the second discharge opening side and is relatively movable along the axis of the second pump chamber in cooperation with increase in the volume of the first pump chamber, the valve mechanism shutting off the communication between the suction chamber and the discharge chamber when the volume of the discharge chamber decreases by the relative movement toward the discharge chamber side and communicating the suction chamber and the discharge chamber when the volume of the discharge chamber increases by the relative movement toward the suction chamber side in cooperation with decrease in the volume of the first pump chamber; in a suction step in which the volume of the first pump chamber increases, the valve mechanism relatively moves toward the discharge chamber side to suck the fluid from the second suction opening into the suction chamber and to fill the first pump chamber with the fluid from the discharge chamber through the second discharge opening and the first suction opening; and in a discharge step in which the volume of the first pump chamber decreases, the fluid is discharged from the first discharge opening and the valve mechanism relatively moves toward the suction chamber side to cause the fluid to flow from the suction chamber into the discharge chamber; where the pump includes, a fluid outflow mechanism that causes the fluid in the discharge chamber to flow out into the suction chamber in accordance with decrease in the volume of the discharge chamber when the valve mechanism decreases the volume of the discharge chamber in cooperation with the increasing movement of the volume of the first pump chamber in a state where the first pump chamber and the discharge chamber are filled with fluid in the suction step.

According to the above, in the suction step, when the valve mechanism decreases the volume of the discharge chamber, the fluid outflow mechanism causes the fluid in the discharge chamber to flow out to the suction chamber in accordance with the decrease in the volume of the discharge chamber, and the rise in pressure of the discharge chamber can be suppressed. Thus, in the suction step, the volume of the first pump chamber can be increased to the maximum volume and the fluid can be sucked while accompanying the relative movement of the valve mechanism, and as a result, the discharge amount of the fluid can be suppressed from decreasing in the discharge step.

DESCRIPTION OF EMBODIMENT

Hereinafter, an embodiment of the present disclosure will be described with reference to the drawings. Each figure used for the description is a conceptual view, and the shape of each portion is not necessarily exact in some cases.

Figure 1:
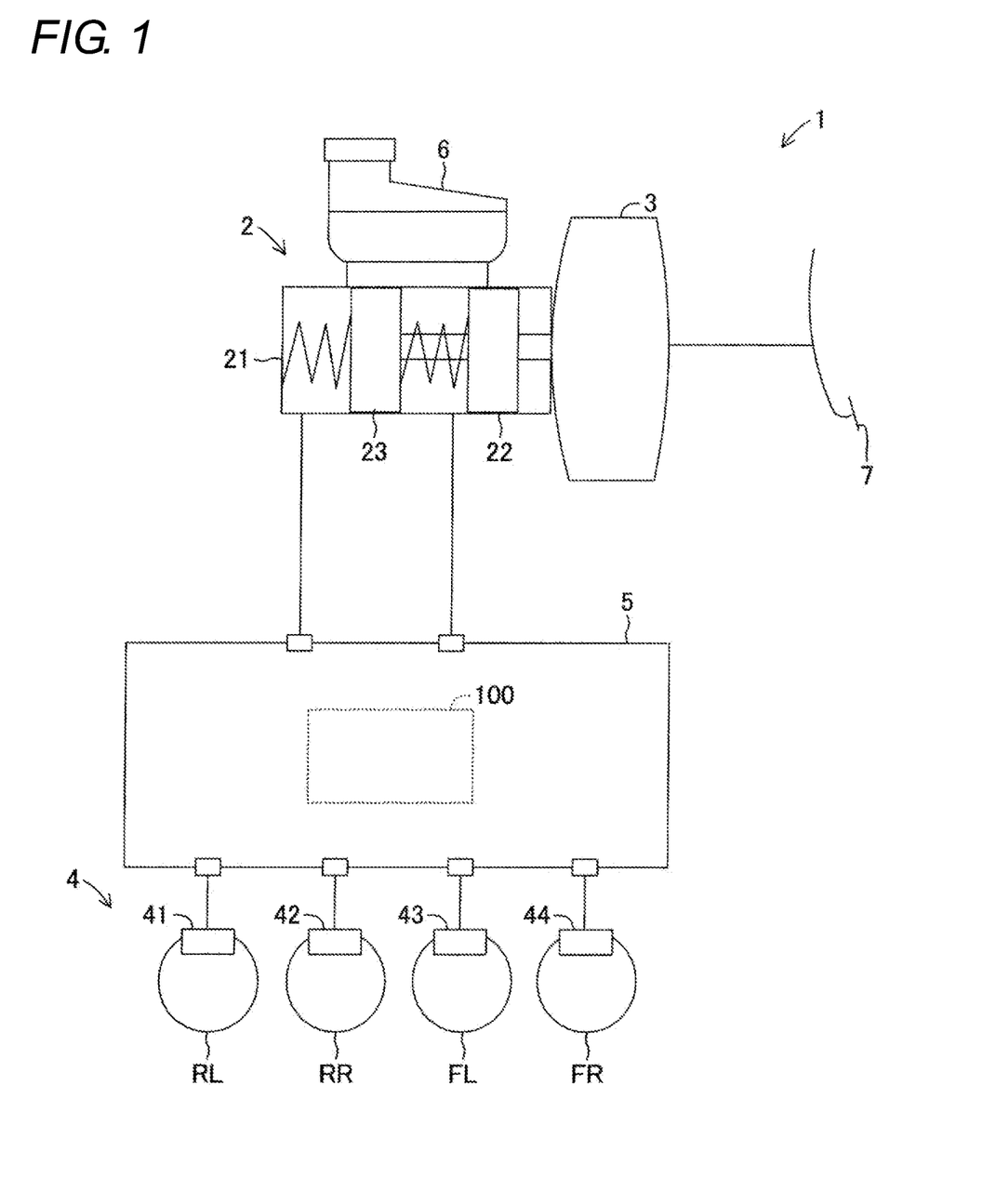
FIG. 1 is a diagram showing a configuration of a brake device provided with a pump according to an embodiment of the present disclosure.

As shown in FIG. 1, a vehicle brake device 1 in the present embodiment includes a master cylinder 2, a brake booster 3, a wheel cylinder 4, a brake actuator 5, and a reservoir tank 6. The master cylinder 2 is configured to include a cylinder main body 21, a first master piston 22, and a second master piston 23. The brake booster 3 is, for example, a negative pressure type booster, which boosts the pedaling force of the driver and transmits it to the first master piston 22 and the second master piston 23. The reservoir tank 6 is liquid-tightly assembled to the cylinder main body 21 by a seal member (e.g., an O-ring or the like).

The wheel cylinder 4 is constituted by a wheel cylinder 41, a wheel cylinder 42, a wheel cylinder 43, and a wheel cylinder 44 provided on each wheel. Each wheel cylinder 41 to 44 is connected to the master cylinder 2 by way of a brake actuator 5 (hereinafter, also simply referred to as "actuator 5"). The wheel cylinder 41 is disposed on a left rear wheel RL of the vehicle. The wheel cylinder 42 is disposed on a right rear wheel RR of the vehicle. The wheel cylinder 43 is disposed on a left front wheel FL of the vehicle. The wheel cylinder 44 is disposed on a right front wheel FR of the vehicle. Thus, when the brake fluid as a fluid is pressurized by the master cylinder 2 or a pump 100, to be described later, and supplied through the actuator 5, the wheel cylinder 4 generates braking force at the left rear wheel RL, the right rear wheel RR, the left front wheel FL and the right front wheel FR.

Although detailed illustration will be omitted, the actuator 5 includes a pipeline, a solenoid valve, a check valve, and the like provided in correspondence with each of the wheel cylinders 41 to 44. Thus, when the solenoid valve is switch-controlled to a communicating state or a shut-off state by a control device (microcomputer) (not shown), the actuator 5 supplies the brake fluid pressurized by the master cylinder 2 to each of the wheel cylinders 41 to 44, or pressure adjusts the brake fluid pressurized by the built-in pump 100 and supplies the same to each of the wheel cylinders 41 to 44. Since the operation of the actuator 5 is not directly related to the present disclosure, detailed description thereof will be omitted.

In the vehicle brake device 1, when the driver depresses a brake pedal 7, the pedaling force is boosted by the negative pressure type brake booster 3 airtightly connected to the master cylinder 2, and the first master piston 22 and the second master piston 23 in the cylinder main body 21 are pressed. The pressed first master piston 22 and second master piston 23 move forward, for example, in the vehicle front-rear direction (axial direction), and pressurize the brake fluid supplied from the reservoir tank 6 to the inside of the master cylinder 2 (more specifically, the cylinder main body 21), respectively. As a result, in the master cylinder 2, the master cylinder pressure is generated, and the master cylinder pressure is supplied (transmitted) to each of the wheel cylinders 41 to 44 through the actuator 5.

Further, in the vehicle brake device 1, for example, the pump 100 built in the actuator 5 is activated at the time of braking of the automatic brake function or to correct the behavior of the vehicle during traveling or at the time of braking. Thus, for example, when the automatic brake function is activated, the pump 100 sucks the brake fluid stored in the reservoir tank 6 through the master cylinder 2 and pressurizes the sucked brake fluid to generate pump pressure. The pump pressure is then adjusted by the actuator 5 and supplied (transmitted) to each of the wheel cylinders 41 to 44.

(1. Details of a Configuration of the Pump 100)

Figure 2:
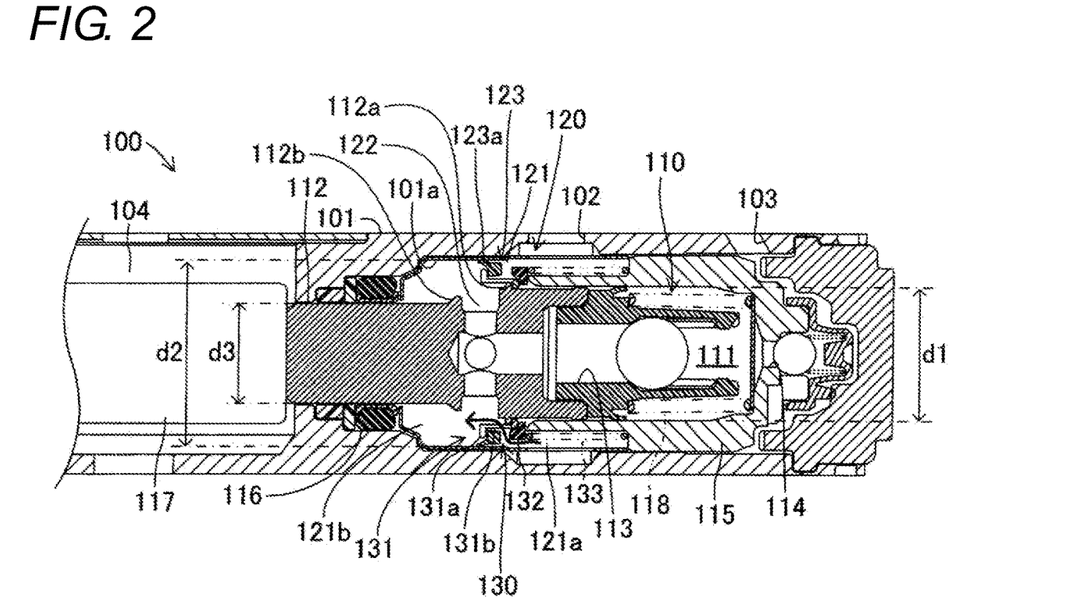
FIG. 2 is a cross-sectional view showing the configuration of the pump of FIG. 1.

Next, a configuration of the pump 100 will be described in detail. The pump 100 is a so-called piston pump, and as shown in FIG. 2, and is configured by providing a first pump mechanism 110 and a second pump mechanism 120 inside the housing 101 of the pump 100. The housing 101 is formed with a suction port 102 communicating with a second pump chamber 121 of the second pump mechanism 120 and a discharge port 103 communicating with a first pump chamber 111.

The first pump mechanism 110 includes the first pump chamber 111 having a variable volume formed inside the housing 101, the piston 112 having one end facing the first pump chamber 111 and assembled inside the housing 101 so as to be slidable in the axial direction, a first suction opening 113 provided at an inlet portion of the first pump chamber 111 and a first discharge opening 114 provided at an outlet portion of the first pump chamber 111. The first pump mechanism 110 sucks the brake fluid, which is a fluid, from the first suction opening 113 into the first pump chamber 111 and discharges the brake fluid from the first discharge opening 114 to the discharge port 103 as the volume of the first pump chamber 111 increases or decreases with the axial sliding of the piston 112.

The first pump chamber 111 is formed in a cylinder member 115 assembled inside the housing 101. The piston 112 has one end side formed of, for example, resin or the like and liquid-tightly inserted into the cylinder member 115, and the outer periphery of the other end side liquid-tightly sealed between the piston 112 and the housing 101 by a seal member 116. Further, on the outer periphery of the piston 112, a circumferential convex portion 112a having a large diameter is provided so as to engage and disengage with a supporting portion 131b of a ring flange 131 that constitutes a fluid outflow mechanism 130 to be described later.

Further, the first pump mechanism 110 includes a suction valve provided at the first suction opening 113 of the first pump chamber 111 and a discharge valve provided at the first discharge opening 114 of the first pump chamber 111. Since the suction valve and the discharge valve are ball valves having a well-known structure as shown in FIG. 2, detailed description of these valves will be omitted.

Further, the first pump mechanism 110 includes an eccentric cam 117 for driving the piston 112 and a return spring 118 for the piston 112. The eccentric cam 117 is arranged in an atmospheric chamber 104 provided in the housing 101. The eccentric cam 117 is attached to a drive shaft (not shown), and as the eccentric cam 117 rotates around the drive shaft, the piston 112 is pushed toward the first pump chamber 111. The return spring 118 is arranged inside the cylinder member 115. The return spring 118 returns the piston 112, which has been moved toward the first pump chamber 111 by the eccentric cam 117, toward the atmospheric chamber 104.

Therefore, the piston 112 reciprocates in the axial direction by the eccentric cam 117 and the return spring 118. The reciprocating motion of the piston 112 increases or decreases the volume of the first pump chamber 111, so that suction and discharge of the brake fluid are performed. In the following description, the step in which the volume of the first pump chamber 111 is increased and the brake fluid is sucked is referred to as a "suction step", and the step in which the volume of the first pump chamber 111 is decreased and the brake fluid is discharged is referred to as a "discharge step".

The second pump mechanism 120 includes a second pump chamber 121 that is formed in a large diameter portion 101a inside the housing 101 and that communicates with the suction port 102 functioning as the second suction opening, a second discharge opening 122 that communicates with the second pump chamber 121 and communicates with the first suction opening 113 of the first pump chamber 111 of the first pump mechanism 110, and a valve portion 123 as a valve mechanism arranged inside the second pump chamber 121. Here, when the inner diameter d1 of the first pump chamber 111 and the outer diameter d3 of the piston 112 are used, the volume of the second pump chamber 121 can be made larger than the maximum volume of the first pump chamber 111 by setting the inner diameter d2 of the second pump chamber 121 (more specifically, the large diameter portion 101a) to be larger than $(d1^2+d3^2)^{1/2}$.

The valve portion 123 is supported by the supporting portion 131b provided on the ring flange 131 of the fluid outflow mechanism 130, to be described later, and includes an annular feed ring 123a that is assembled so as to be relatively movable along the axis of the second pump chamber 121 to be able to follow the movement of the piston 112. The feed ring 123a can be brought into contact with and separated away from a seal member 132 of the fluid outflow mechanism 130, to be described later. As a result, the valve portion 123, that is, the feed ring 123a forms a suction chamber 121a on the suction port 102 (second suction opening) side and a discharge chamber 121b on the second discharge opening 122 side inside the second pump chamber 121.

In the valve portion 123, when the feed ring 123a relatively moves toward the discharge chamber 121b side with respect to the second pump chamber 121, that is, the housing 101 along the axis of the second pump chamber 121 in cooperation with increase in the volume of the first pump chamber 111 in the suction step and the volume of the discharge chamber 121b decreases, the feed ring 123a and the seal member 132 abut with each other to shut off the communication between the suction chamber 121a and the discharge chamber 121b. On the other hand, in the valve portion 123, when the feed ring 123a relatively moves toward the suction chamber 121a side with respect to the second pump chamber 121, that is, the housing 101 along the axis of the second pump chamber 121 in cooperation with decrease in the volume of the first pump chamber 111 in the discharge step and the volume of the discharge chamber 121b increases, the feed ring 123a and the seal member 132 separate from each other to communicate the suction chamber 121a and the discharge chamber 121b.

Figure 3:
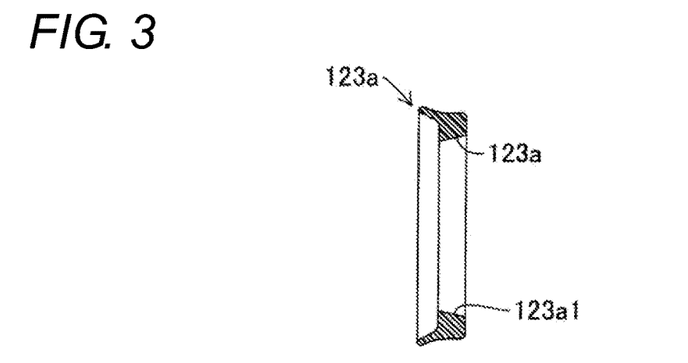
FIG. 3 is a cross-sectional view showing a configuration of a feed ring configuring a valve mechanism of FIG. 2.

The feed ring 123a is a cup seal formed of an oil-resistant rubber material, an oil-resistant soft resin, or the like, where the outer peripheral edge is sealed by coming into contact with the peripheral wall surface of the housing 101 (large diameter portion 101a). As shown in FIG. 3, the feed ring 123a is provided with an inner diameter enlarged portion 123a1 formed by a tapered hole. The tapered hole forming the inner diameter enlarged portion 123a1 is a hole whose diameter is enlarged on the side facing the seal member 132 of the fluid outflow mechanism 130, to be described later. The inner diameter of the feed ring 123a on the side facing the discharge chamber 121b is set to be larger than the outer diameter of the supporting portion 131b provided at the central portion in the axial direction of the ring flange 131 of the fluid outflow mechanism 130. As described above, since the feed ring 123a includes the inner diameter enlarged portion 123a1, the cross-sectional area of the flow path when the brake fluid flows from the suction chamber 121a to the discharge chamber 121b is enlarged, and as a result, the suction resistance of the brake fluid with respect to the discharge chamber 121b can be reduced. The feed ring 123a may not necessarily include the inner diameter enlarged portion 123a1.

As shown in FIG. 2, the fluid outflow mechanism 130 includes the ring flange 131, the seal member 132, and a spring 133 as an urging member. The seal member 132 is relatively movable with respect to the piston 112.

Figure 4:
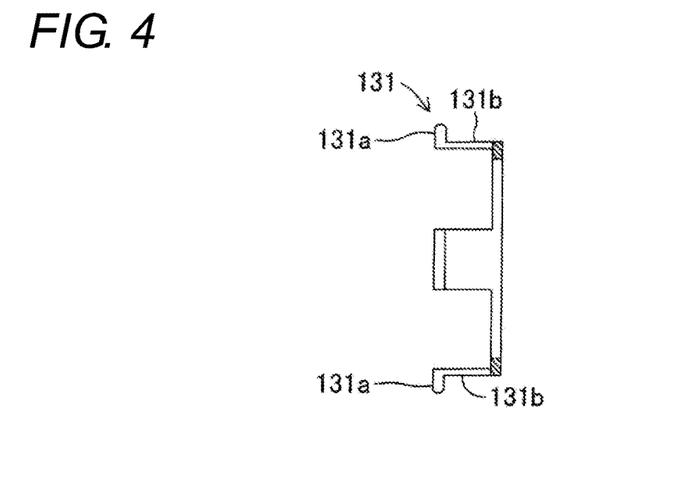
FIG. 4 is a cross-sectional view showing a configuration of a ring flange of FIG. 1.

As shown in FIG. 4, the ring flange 131 is formed in an annular shape from a metal material or a resin material, and abuts to the circumferential convex portion 112a provided on the outer periphery of the piston 112 to be liquid-tightly press-fitted with respect to the outer peripheral surface of the piston 112. The ring flange 131 has an abutment portion 131a and the supporting portion 131b.

The abutment portion 131a projects out in the radial direction with respect to the supporting portion 131b, and regulates the relative movement amount of the feed ring 123a supported by the supporting portion 131b. Further, the abutment portion 131a abuts to the feed ring 123a according to the movement of the piston 112 in the discharge step, and follows the movement of the piston 112. Further, a plurality of abutment portions 131a are provided so as to be spaced apart along the circumferential direction of the ring flange 131. That is, a slit is formed between the abutment portions 131a adjacent to each other so that the brake fluid supplied from the suction chamber 121a to the discharge chamber 121b flows. The supporting portion 131b has an outer diameter smaller than the inner diameter of the feed ring 123a of the valve portion 123 at the central portion in the axial direction, and supports the feed ring 123a so as to be relatively movable along the axis.

Figure 5:
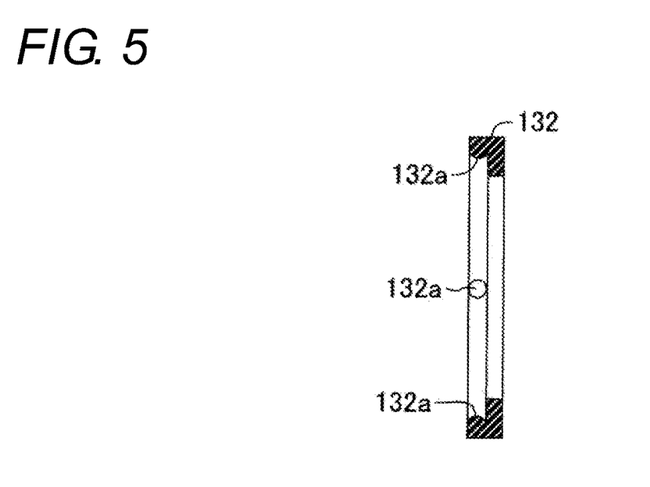
FIG. 5 is a cross-sectional view showing a configuration of a seal member of FIG. 1.

The seal member 132 is formed in an annular shape from an oil-resistant rubber material, an oil-resistant soft resin, or the like, and as shown in FIG. 2, is disposed on the suction chamber 121a side of the second pump chamber 121 with respect to the ring flange 131 that abuts to the circumferential convex portion 112a of the piston 112. As shown in FIG. 5, the seal member 132 is assembled with an interference on the peripheral side surface of the supporting portion 131b of the ring flange 131, and is formed to come into contact with and separate away from the end portion of the relatively movable feed ring 123a on the inner diameter enlarged portion 123a1 side and the peripheral side surface of the supporting portion 131b. Alternatively, when the seal member 132 comes into contact with the peripheral side surface of the supporting portion 131b to mainly seal, as shown in FIG. 5, a plurality of convex portions 132a can be formed on a surface of the inner peripheral surface of the seal member 132 facing the outer peripheral surface of the supporting portion 131b. Thus, the seal member 132 constitutes the valve portion 123 together with the feed ring 123a, and the brake fluid can be caused to flow out (relieve) more smoothly when the brake fluid is outflowed in the suction step described later. The plurality of convex portions 132a can be omitted.

The spring 133 urges the seal member 132 toward the discharge chamber 121b of the second pump chamber 121. Thus, the seal member 132 is pressed against the end portion of the feed ring 123a on the inner diameter enlarged portion 123a1 side and the peripheral side surface of the supporting portion 131b. Here, the magnitude of the urging force of the spring 133 is preferably set to be smaller than the magnitude of the urging force when the return spring 118 returns the piston 112.

(2. Operation of the Pump 100)

Next, the operation of the pump 100 will be described from the suction step of sucking the brake fluid into the first pump chamber 111 of the first pump mechanism 110. In the suction step, the piston 112 cannot be further moved toward the first pump chamber 111 by the eccentric cam 117 due to the previous discharge step, and is located at a top dead center, which is a point where the volume of the first pump chamber 111 becomes the minimum volume. Then, the piston 112 cannot be moved toward the eccentric cam 117, that is, toward the eccentric cam 117 any further by the urging force of the return spring 118 acting with the rotation of the eccentric cam 117, and starts to move toward the bottom dead center, which is a point where the volume of the first pump chamber 111 becomes the maximum. Thus, the volume of the first pump chamber 111 starts to increase from the minimum volume with the movement of the piston 112 toward the bottom dead center.

At this time, in the second pump mechanism 120, the ring flange 131 and the seal member 132 of the fluid outflow mechanism 130 move following the movement of the piston 112 toward the bottom dead center by the urging force of the spring 133. The feed ring 123a of the valve portion 123, on the other hand, is stationary because it is in contact with the large diameter portion 101a. Then, the seal member 132 moves toward the bottom dead center side and abuts with the feed ring 123a.

Figure 6:
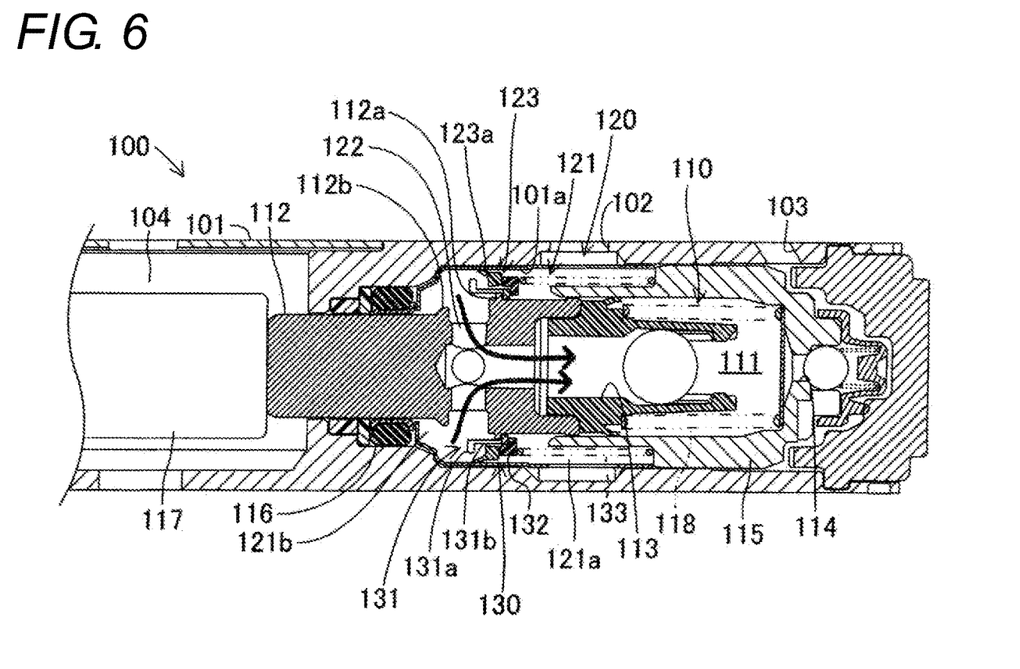
FIG. 6 is a cross-sectional view for explaining a case where a piston is between the top dead center and the bottom dead center.

That is, in this state, as shown in FIG. 6, the feed ring 123a and the seal member 132 come into contact with each other, and the valve portion 123 is closed. Further, the outer peripheral surface of the feed ring 123a is sealed by coming into contact with the peripheral wall surface of the second pump chamber 121 (large diameter portion 101a of the housing 101), and the inner peripheral surface of the seal member 132 and the peripheral side surface of the supporting portion 131b of the ring flange 131 are sealed by coming into contact, so that the communication between the suction chamber 121a and the discharge chamber 121b is shut off.

In this way, when the fluid outflow mechanism 130 moves following the piston 112 toward the bottom dead center together with the feed ring 123a in a state where the communication between the suction chamber 121a and the discharge chamber 121b is shut off, the brake fluid filled in the discharge chamber 121b is pressurized. The pressurized brake fluid is then pressurized and discharged from the second discharge opening 122 toward the first suction opening 113 of the first pump mechanism 110, as shown by the thick arrow in FIG. 6. In the first pump mechanism 110, when the pressurized brake fluid is supplied in addition to the volume of the first pump chamber 111 increasing and the pressure in the chamber decreasing as the piston 112 moves to the bottom dead center, the suction valve (ball valve) of the first suction opening 113 is opened. Therefore, the brake fluid discharged from the discharge chamber 121b of the second pump chamber 121 is sucked into the first pump chamber 111.

Since the feed ring 123a moves following the piston 112 together with the fluid outflow mechanism 130, the volume of the discharge chamber 121b of the second pump chamber 121 decreases, while the volume of the suction chamber 121a increases. Therefore, in the suction step, the brake fluid is sucked into the suction chamber 121a of the second pump chamber 121 through the suction port 102 (first suction opening).

Then, when the movement of the piston 112 toward the bottom dead center is continued, the first pump chamber 111 is filled with brake fluid, and the brake fluid becomes less likely to be discharged from the discharge chamber 121b of the second pump chamber 121 toward the first suction opening 113 of the first pump chamber 111. Thus, when the volume of the discharge chamber 121b decreases in a state where the brake fluid is less likely to be discharged from the discharge chamber 121b, the pressure inside the discharge chamber 121b increases. As a result, the drag force generated due to the increase in the pressure inside the discharge chamber 121b acts on the seal member 132 of the fluid outflow mechanism 130 and the feed ring 123a, that is, the valve portion 123 that move by the pressing force, that is, the urging force of the spring 133 generated when the volume of the discharge chamber 121b decreases.

Figure 7:
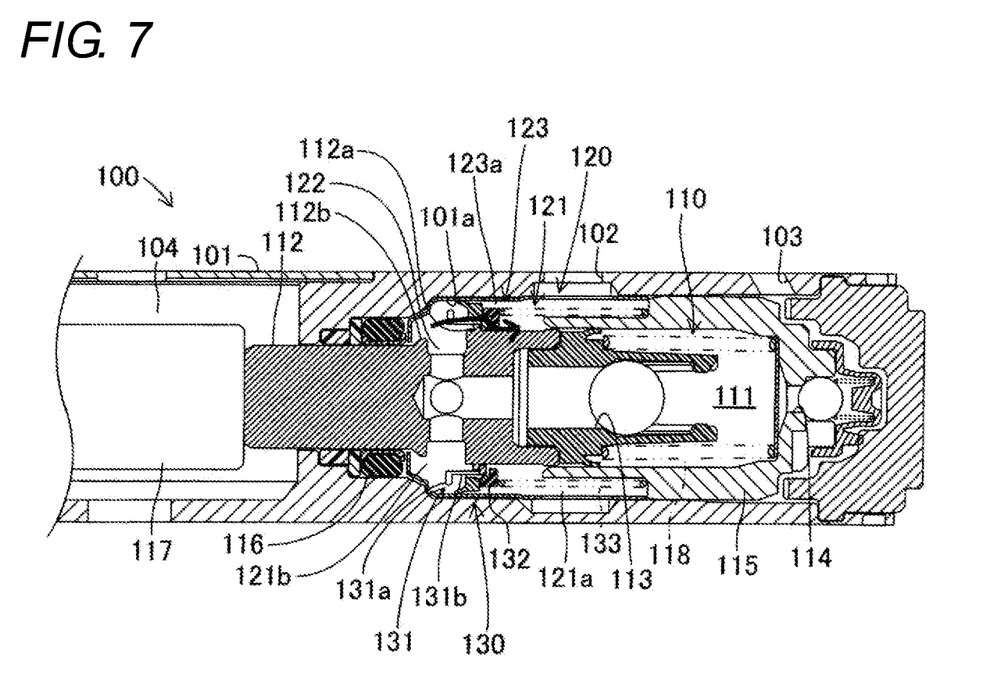
FIG. 7 is a cross-sectional view for explaining a case where the piston is at the bottom dead center.

Then, as shown in FIG. 7, at a balance between the pressing force (e.g., urging force of the spring 133) generated when the volume of the discharge chamber 121b acting on the valve portion 123 decreases and the drag force, when the drag force becomes larger than the urging force of the spring 133, the seal member 132 of the fluid outflow mechanism 130 and the feed ring 123a temporarily stop without following the piston 112 and the ring flange 131 of the fluid outflow mechanism 130. That is, the seal member 132 and the feed ring 123a temporarily stop independently of the movement of the piston 112 (and the ring flange 131) without following the piston 112 and the press-fitted ring flange 131.

Thus, in a state where the seal member 132 and the feed ring 123*a* are temporarily stopped, the piston 112 and the ring flange 131 continue to move toward the bottom dead center. Thus, as a seal position, the seal of at least one of the feed ring 123*a* and the seal member 132, and the peripheral side surface of the ring flange 131 and the seal member 132, for example, the peripheral side surface of the ring flange 131 and the seal member 132 is released. As a result, as shown by the thick arrow in FIG. 7, the brake fluid in the discharge chamber 121*b* flows out toward the suction chamber 121*a* through a gap formed between the inner peripheral surface of the seal member 132 and the ring flange 131. Therefore, the pressure in the discharge chamber 121*b* decreases.

When the pressure in the discharge chamber 121*b* decreases as the brake fluid flows out from the discharge chamber 121*b* toward the suction chamber 121*a*, as shown in FIG. 6, the seal member 132 is pressed toward the peripheral side surface of the ring flange 131 and the seal member 132 presses the feed ring 123*a* by the urging force of the spring 133. Thus, again, the inner peripheral surface of the seal member 132 and the peripheral side surface of the ring flange 131 are sealed, and the seal member 132 and the feed ring 123*a* are sealed.

That is, in the suction step, when the pressure in the discharge chamber 121*b* increases and the feed ring 123*a* and the seal member 132 cannot follow the piston 112 and the ring flange 131 due to the urging force of the spring 133, the seal member 132 allows the outflow (relief) of the brake fluid from the discharge chamber 121*b* toward the suction chamber 121*a*. On the other hand, when the pressure in the discharge chamber 121*b* decreases due to the outflow of the brake fluid, the seal member 132 prohibits the outflow (relief) of the brake fluid from the discharge chamber 121*b* to the suction chamber 121*a*, and again, the feed ring 123*a* and the seal member 132 follow the piston 112 and the ring flange 131 by the urging force of the spring 133. Then, by repeating such outflow (relief) of the brake fluid, the increase in the pressure in the discharge chamber 121*b* is suppressed.

Here, the piston 112 continues to move toward the bottom dead center. Therefore, the volume of the first pump chamber 111 continues to increase toward the maximum volume. In this case, since the pressure inside the discharge chamber 121*b* is appropriately maintained by repeatedly causing the brake fluid to flow out (relieve), the brake fluid is supplied from the discharge chamber 121*b* toward the first pump chamber 111. Therefore, the necessary and sufficient brake fluid corresponding to the volume of the first pump chamber 111 is supplied to the first pump chamber 111 as the piston 112 moves toward the bottom dead center. Then, as shown in FIG. 7, the piston 112 completes the movement to the bottom dead center. When the piston 112 moves to the bottom dead center in this way, the volume of the first pump chamber 111 becomes the maximum volume and a state filled with the brake fluid discharged from the discharge chamber 121*b*, that is, the filled state is obtained. That is, the suction performance is improved.

Next, a discharge step of discharging the brake fluid sucked into the first pump chamber 111 of the first pump mechanism 110 from the discharge port 103 will be described. In the discharge step, the piston 112 is located at the bottom dead center as shown in FIG. 7 by the suction step described above. Then, the piston 112 starts to move from the bottom dead center toward the top dead center as the eccentric cam 117 rotates. Thus, the volume of the first pump chamber 111 starts to decrease from the maximum volume as the piston 112 moves toward the top dead center.

Here, as the piston 112 moves toward the top dead center, the brake fluid is pressurized in the first pump chamber 111 filled with the brake fluid. Then, as the brake fluid is pressurized, the discharge valve (ball valve) of the first discharge opening 114 is opened. Therefore, the brake fluid discharged from the first discharge opening 114 of the first pump chamber 111 is discharged to each of the wheel cylinders 41 to 44 from the discharge port 103 provided in the housing 101.

At this time, in the second pump mechanism 120, the feed ring 123*a* is abutted to the seal member 132, and as a result, the valve portion 123 is maintained in the closed state (see, e.g., FIG. 6). Then, when the piston 112 continues to move toward the top dead center, the fluid outflow mechanism 130 and the feed ring 123*a* move following the piston 112, and the volume of the discharge chamber 121*b* of the second pump chamber 121 increases.

When the piston 112 moves toward the top dead center, the ring flange 131 and the seal member 132 move toward the top dead center in cooperation with the movement of the piston 112 (circumferential convex portion 112*a*). At this time, the feed ring 123*a* is stationary because it is in contact with the large diameter portion 101*a*. As a result, as shown in FIG. 2, the feed ring 123*a* and the seal member 132 separate from each other, that is, the valve portion 123 opens, and the suction chamber 121*a* and the discharge chamber 121*b* communicate with each other. Further, when the piston 112 moves toward the top dead center, the abutment portion 131*a* of the ring flange 131 abuts with the feed ring 123*a*. As a result, the feed ring 123*a* can move following the piston 112, as shown in FIG. 2.

Thus, as shown by the thick arrow in FIG. 2, the brake fluid flows through a gap formed between the outer periphery of the supporting portion 131*b* of the ring flange 131 and the inner periphery of the feed ring 123*a*, more specifically, the inner diameter enlarged portion 123*a*1 from the suction chamber 121*a* of the second pump chamber 121, which is at atmospheric pressure, toward the discharge chamber 121*b*, whose pressure decreased with increase in volume. Therefore, the brake fluid flows into the discharge chamber 121*b* from the suction chamber 121*a*.

Then, as shown in FIG. 2, the piston 112 completes the movement to the top dead center. When the piston 112 moves to the top dead center in this way, the discharge chamber 121*b* of the second pump chamber 121 is filled with the brake fluid sucked from the suction chamber 121*a*. The pump 100 repeatedly performs the suction step and the discharge step described above.

As can be understood from the above description, the pump 100 of the above embodiment is provided with a first pump mechanism 110 including a first pump chamber 111 having a variable volume and a first suction opening 113 and a first discharge opening 114 that communicate to the first pump chamber 111, an incompressible brake fluid as a fluid being sucked from the first suction opening 113 and the brake fluid being discharged from the first discharge opening 114 according to increase or decrease in the volume of the first pump chamber 111; and a second pump mechanism 120 including a second pump chamber 121, a suction port 102 as a second suction opening that communicates to the second pump chamber 121, a second discharge opening 122 that communicates to the second pump chamber 121 and also communicates to the first suction opening 113, and a valve portion 123 (feed ring 123a) as a valve mechanism that is arranged inside the second pump chamber 121 to form a suction chamber 121a on the suction port 102 side and form a discharge chamber 121b on the second discharge opening 122 side and is relatively movable along the axis of the second pump chamber 121 in cooperation with increase in the volume of the first pump chamber 111, the valve portion shutting off the communication between the suction chamber 121a and the discharge chamber 121b when the volume of the discharge chamber 121b decreases by the relative movement toward the discharge chamber 121b side and communicating the suction chamber 121a and the discharge chamber 121b when the volume of the discharge chamber 121b increases by the relative movement toward the suction chamber 121a side in cooperation with decrease in the volume of the first pump chamber 111; where in a suction step in which the volume of the first pump chamber 111 increases, the feed ring 123a of the valve portion 123 relatively moves toward the discharge chamber 121b side to suck the brake fluid from the suction port 102 into the suction chamber 121a and to fill the first pump chamber 111 with the brake fluid from the discharge chamber 121b through the second discharge opening 122 and the first suction opening 113; and in a discharge step in which the volume of the first pump chamber 111 decreases, the brake fluid is discharged from the first discharge opening 114 and the feed ring 123a of the valve portion 123 relatively moves toward the suction chamber 121a side to cause the brake fluid to flow out from the suction chamber 121a into the discharge chamber 121b.

The pump 100 includes the fluid outflow mechanism 130 that causes the brake fluid in the discharge chamber 121b to flow out into the suction chamber 121a in accordance with decrease in the volume of the discharge chamber 121b when the feed ring 123a of the valve portion 123 decreases the volume of the discharge chamber 121b in cooperation with the increasing movement of the volume of the first pump chamber 111 in a state where the first pump chamber 111 and the discharge chamber 121b are filled with brake fluid in the suction step.

In this case, more specifically, the pump 100 includes the piston 112 that moves to increase or decrease the volume of the first pump chamber 111, the feed ring 123a that moves in cooperation with the movement of the piston 112 and constitutes the valve portion 123 relatively movable along the axis with respect to the piston 112, the seal member 132 of the fluid outflow mechanism 130 provided to come into contact with and separate away from the feed ring 123a, the spring 133 of the fluid outflow mechanism 130 that urges the seal member 132 (includes ring flange 131) along the axis to abut the seal member 132 and the feed ring 123a, and the ring flange 131 of the fluid outflow mechanism 130 provided to come into contact with the piston 112 (more specifically, circumferential convex portion 112a) and the seal member 132 and to come into contact with and separate away from the seal member 132; where the feed ring 123a and the seal member 132, the feed ring 123a and the peripheral wall surface of the large diameter portion 101a of the housing 101 forming the second pump chamber 121, the ring flange 131 and the seal member 132, and the ring flange 131 and the piston 112 (circumferential convex portion 112a of the piston 112) each come into contact with each other in a liquid-tight manner to shut off the communication between the suction chamber 121a and the discharge chamber 121b, and the feed ring 123a and the seal member 132 separate to communicate the suction chamber 121a and the discharge chamber 121b, the peripheral side surface of the ring flange 131 and the inner peripheral surface of the seal member 132 come into contact with and separate away from each other as at least one of the seal position including the feed ring 123a and the seal member 132, and the peripheral side surface of the ring flange 131 and the inner peripheral surface of the seal member 132 in accordance with decrease in the volume of the discharge chamber 121b in the suction step to cause the brake fluid in the discharge chamber 121b to flow out (relieve) into the suction chamber 121a.

According to the above, in the suction step, when the valve portion 123 (feed ring 123a) decreases the volume of the discharge chamber 121b, the seal member 132 (and the ring flange 131) of the fluid outflow mechanism 130 outflows (reliefs) the brake fluid in the discharge chamber 121b into the suction chamber 121a in accordance with decrease in the volume of the discharge chamber 121b so that rise in pressure of the discharge chamber 121b can be suppressed. Thus, in the suction step, the volume of the first pump chamber 111 can be increased to a maximum volume and the brake fluid can be sucked while accompanying the relative movement of the feed ring 123a and the seal member 132, and as a result, the decrease in the discharge amount of the fluid in the discharge step can be suppressed.

Further, in the suction step, the piston 112 can be reliably moved from the top dead center to the bottom dead center without stopping. Thus, the other end side of the piston 112 can always be brought into contact with the rotating eccentric cam 117. Therefore, for example, when the piston 112 is stopped, a state in which the other end side of the piston 112 separates away from the eccentric cam 117 may occur, and abnormal noise when coming into contact again with the rotating eccentric cam 117 can be prevented from generating.

Further, the inner diameter d2 of the second pump chamber 121 (more specifically, the large diameter portion 101a of the housing 101) can be set to be larger than $(d1^2+d3^2)^{1/2}$. Thus, the volume of the second pump chamber 121 can be increased, and as a result, necessary and sufficient brake fluid can be discharged (supplied) from the second pump chamber 121 toward the first pump chamber 111. As a result, even when the piston 112 moves to the bottom dead center and the volume of the first pump chamber 111 reaches the maximum volume, the inside of the first pump chamber 111 can be reliably filled with the brake fluid. Therefore, when the brake fluid is supplied from the pump 100 to each of the wheel cylinders 41 to 44, for example, a sufficient discharge amount to be discharged from the pump 100 can be secured.

Here, in addition to or instead of the peripheral side surface of the ring flange 131 and the inner peripheral surface of the seal member 132 coming into contact or separating away, the fluid outflow mechanism 130 may bring the feed ring 123a and the seal member 132, which is the seal position, into contact or separate them away in accordance with the decrease in the volume of the discharge chamber 121b in the suction step to open and close the valve portion 123, and cause the brake fluid in the discharge chamber 121b to flow out (relieve) into the suction chamber 121a.

According to the above, in the suction step, the fluid outflow mechanism 130 can also cause the brake fluid to flow out (relieve) from the discharge chamber 121b into the suction chamber 121a by opening and closing the valve portion 123, that is, bringing the feed ring 123a and the seal member 132 into contact or separating them away, and thus rise in pressure of the discharge chamber 121b can be effectively suppressed. Therefore, even in this case as well, the piston 112 can reliably move to the bottom dead center in the suction step, and the volume of the first pump chamber 111 can be increased to the maximum volume and the brake fluid can be sucked. As a result, decrease in the discharge amount of the brake fluid in the discharge step can be suppressed. Further, since the brake fluid can be caused to flow out from the discharge chamber 121b to the suction chamber 121a by opening and closing the valve portion 123, the size of the pump 100 can be reduced.

The implementation of the present disclosure is not limited to the above embodiment, and various modifications can be made without departing from the purpose of the present disclosure.

For example, in the embodiment described above, the supporting portion 131b of the ring flange 131 in the fluid outflow mechanism 130 is abutted to the circumferential convex portion 112a and press-fitted so as to be liquid-tight with respect to the outer peripheral surface of the piston 112. Instead, it may be integrally formed with the piston 112.

Further, in the embodiment described above, one piston 112 of the pump 100 has been illustratively described. However, it goes without saying that the pump 100 is not limited to one piston 112, and may be a multi-cylinder pump including a plurality of pistons 112. Thus, when the pump 100 includes multiple cylinders, the generation of abnormal noise due to the abutment between each piston 112 and the eccentric cam 117 is prevented, as described above, and further quietness can be achieved.

Further, in the embodiment described above, the fluid outflow mechanism 130 is configured by the ring flange 131, the seal member 132, and the spring 133, and the supporting portion 131b of the ring flange 131 is configured to support the feed ring 123a. The supporting portion 131b of the ring flange 131 supports the feed ring 123a so as to be relatively movable with respect to the piston 112, and the seal member 132 relatively moves with respect to the piston 112, so that the fluid outflow mechanism 130 outflows (relieves) the brake fluid of the discharge chamber 121b of the second pump chamber 121.

However, instead of the fluid outflow mechanism 130 being configured by the ring flange 131, the seal member 132, and the spring 133, for example, another device capable of causing the brake fluid in the discharge chamber 121b to flow out into the suction chamber 121a can be configured to communicate to the suction chamber 121b and the suction chamber 121a in correspondence with the increase or decrease in pressure in the discharge chamber 121b. In this case, examples of another device include a relief valve provided outside the housing 101, and the like.

As described above, even when another device for increasing or decreasing the volume of the discharge chamber 121b is used, the pressure inside the discharge chamber 121b can be maintained in a state of being smaller than a predetermined pressure. Therefore, for example, when a sliding ring (feed ring) is assembled so as to be relatively movable in the annular groove provided in the piston, and the relative moving range of the sliding ring (feed ring) is limited, that is, even when relatively immovable independent from the piston, as with the conventional pump, the piston can be reliably moved to the bottom dead center. Therefore, in this case as well, effects similar to the above embodiment can be expected.

Moreover, in the embodiment described above, the fluid outflow mechanism 130 includes the ring flange 131 that can move integrally with the piston 112. In this case, if the feed ring 123a and the seal member 132 can be moved following the piston 112 in the discharge step, the fluid outflow mechanism 130 can be configured with the ring flange 131 omitted therefrom. In this case, for example, a structure is conceivable in which a supporting portion is provided on the feed ring 123a and the supporting portion comes into contact with and separates away from the second circumferential convex portion 112b (see FIG. 2 etc.) of the piston 112.

In this case, the pump 100 includes the piston 112 that moves to increase or decrease the volume of the first pump chamber 111, the feed ring 123a that moves in cooperation with the movement of the piston 112 and constitutes the valve portion 123 relatively movable along the axis with respect to the piston 112, the seal member 132 of the fluid outflow mechanism 130 provided to come into contact with and separate away from the feed ring 123a, and the spring 133 of the fluid outflow mechanism 130 that urges the seal member 132 along the axis to abut the seal member 132 and the feed ring 123a, where the feed ring 123a and the seal member 132, the feed ring 123a and the peripheral wall surface of the second pump chamber 121 (more specifically, the large diameter portion 101a of the housing 101), the seal member 132 and the piston 112 (more specifically, circumferential convex portion 112a of the piston 112) each come into contact with each other to shut off the communication between the suction chamber 121a and the discharge chamber 121b, and the feed ring 123a and the seal member 132 separate to communicate the suction chamber 121a and the discharge chamber 121b, at least one of the seal positions including the feed ring 123a and the seal member 132, and the seal member 132 and the piston 112 (circumferential convex portion 112a) coming into contact and separating away in accordance with decrease in the volume of the discharge chamber 121b in the suction step to cause the brake fluid in the discharge chamber 121b to flow out (relieve) into the suction chamber 121a. Therefore, in this case as well, effects similar to the above embodiment can be expected.

The invention claimed is:

1. A pump, comprising:
a first pump mechanism including a first pump chamber having a variable volume and a first suction opening and a first discharge opening that communicate to the first pump chamber, fluid being sucked from the first suction opening and the fluid being discharged from the first discharge opening according to increase or decrease in the volume of the first pump chamber, and
a second pump mechanism including a second pump chamber, a piston disposed in the second pump chamber and movable relative to the second pump chamber along an axis of the second pump chamber, a second suction opening that communicates to the second pump chamber, a second discharge opening that communicates to the second pump chamber and also communicates to the first suction opening, and a valve mechanism that is arranged inside the second pump chamber to form a suction chamber on a second suction opening side and form a discharge chamber on a second discharge opening side,
wherein the first pump mechanism sucks fluid from the first suction opening in response to relative movement of the piston from a top dead center side to a bottom dead center side, and discharges fluid from the first discharge opening in response to relative movement of the piston from the bottom dead center side to the top dead center side, and the valve mechanism has an annular feed ring that is movable relative to the second pump chamber along the axis and that is attached to the periphery of the piston and can follow the movement of the piston, and the feed ring compartmentalizes the second pump chamber so that the suction chamber is located on the top dead center side in the direction of the axis and the discharge chamber is located on the bottom dead center side in the direction of the axis, and the valve mechanism shutting off the communication between the suction chamber and the discharge chamber when the volume of the discharge chamber decreases by the relative movement of the feed ring from the top dead center side to the bottom dead center side in cooperation with the relative movement of the piston from the top dead center side to the bottom dead center side and communicating the suction chamber and the discharge chamber when the volume of the discharge chamber increases by the relative movement of the feed ring from the bottom dead center side to the top dead center side in cooperation with the relative movement of the piston from the bottom dead center side to the top dead center side, in a suction step in which the piston moves relatively from the top dead center side to the bottom dead center side, the relative movement of the feed ring from the top dead center side to the bottom dead center side causes the pump to suck the fluid from the second suction opening into the suction chamber and to fill the first pump chamber with the fluid from the discharge chamber through the second discharge opening and the first suction opening, and in a discharge step in which the piston moves relatively from the bottom dead center side to the top dead center side, the fluid is discharged from the first discharge opening and the feed ring relatively moves toward the top dead center side to cause the fluid to flow from the suction chamber into the discharge chamber, the pump comprising:

a fluid outflow mechanism that causes the fluid in the discharge chamber to flow out into the suction chamber in accordance with decrease in the volume of the discharge chamber when the feed ring decreases the volume of the discharge chamber in cooperation with the relative movement of the piston from the top dead center side to the bottom dead center side in a state where the first pump chamber and the discharge chamber are filled with fluid in the suction step, wherein the fluid outflow mechanism opens and closes the valve mechanism in accordance with decrease in the volume of the discharge chamber in the suction step, and causes the fluid in the discharge chamber to flow out into the suction chamber.

2. The pump according to claim 1, wherein the fluid outflow mechanism is provided with a spring that forces a seal member that is a component of the valve mechanism toward the discharge chamber, and when a force generated by an increase in an internal pressure of the discharge chamber is greater than a force exerted by the spring, a sealing of the seal member is released and an outflow of fluid from the discharge chamber to the suction chamber is allowed, and when the force generated by the increase in the internal pressure of the discharge chamber becomes smaller than the force of the spring, the sealing of the seal member prohibits the outflow of fluid from the discharge chamber to the suction chamber.

* * * * *